(No Model.)
J. F. PLUMMER & H. P. CHAPMAN.
NUT LOCK.
No. 292,507. Patented Jan. 29, 1884.
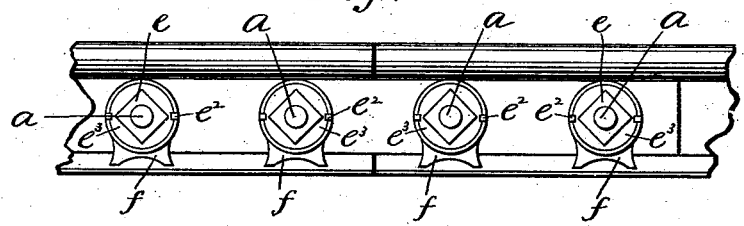
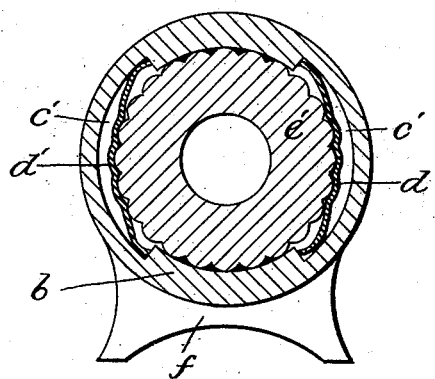
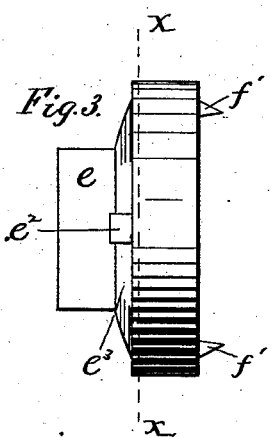 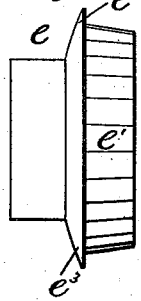 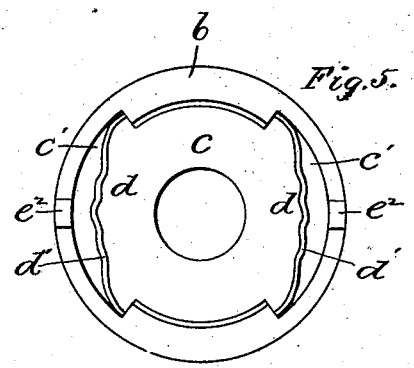
Witnesses
Ed. F. Dimock.
A. C. Tanner.
Inventors
John F. Plummer
and Henry P. Chapman,
By Simonds & Burdett,
Att'ys.

UNITED STATES PATENT OFFICE.

JOHN F. PLUMMER AND HENRY P. CHAPMAN, OF ESSEX, CONNECTICUT.

NUT-LOCK.

SPECIFICATION forming part of Letters Patent No. 292,507, dated January 29, 1884.

Application filed December 12, 1883. (No model.)

*To all whom it may concern:*

Be it known that we, JOHN F. PLUMMER and HENRY P. CHAPMAN, both of Essex, in the county of Middlesex and State of Connecticut, have invented certain new and useful Improvements in Nut-Locks; and we do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1 is a side view of our improved nut-lock as used with fish-plates on railroads. Fig. 2 is a view on enlarged scale, in section, of our device on a plane at right angles to the axis of the bolt. Fig. 3 is a side view of our device, showing rearward-projecting points on the washer instead of the feet shown in Figs. 1 and 2. Fig. 4 is a detail edge view of the nut. Fig. 5 is a plan view of the washer, showing the interior of same viewed from the front.

Our invention relates to the class of nut-locks in which an added part—as a washer or collar, that is placed between the nut and the body of the thing bearing the bolt—is used; and it consists, mainly, in providing the nut with a tapered and corrugated body fitted within a washer bearing a frictional clamp, a spring with projections that engage in the corrugations in the nut-body and prevent the ready turning of the nut, and the washer having projections which prevent its turning.

In the accompanying drawings, the letter $a$ denotes a bolt of usual construction; $b$, a washer of metal, that is hollowed out and open to the front, the hole at the center of the back being slightly greater in diameter than the bolt on which it fits. The chamber $c$ in this washer has lateral sockets $c'$, in which are seated the springs $d'$, that are supported by their ends, and have projections or corrugations on the sides and in the plane of the axis of the nut. These springs are preferably struck up in the form shown, and are arranged in the sockets so as to engage the diametrically-opposite sides of the nut $e$; but it is evident that a spring-pawl of common form can be used in place of the side springs to furnish the required yielding pressure on the nut that prevents its shaking loose or turning unless a certain amount of force is purposely employed, and this device with this office we call a "frictional clamp," $d$. The nut-body has a tapered lower part, $e'$, that is roughened, preferably by corrugations, as shown, for the more ready introduction of the nut into the chamber in the washer and between the springs, that are forced apart by such insertion of the nut and grasp it with a degree of pressure depending on the strength of the springs. The washer is provided with the foot $f$, when intended for use on railroads, and the feet bear on the lower web of the rail, as shown in Fig. 1, thus preventing the rotation of the washer, which is a necessary point in our invention.

When the nut-lock is to be used on soft material—as wood or the like—the washer has the points $f'$, that are the alternate and equivalent form of the foot, having the same function in the working of the device.

To prevent the accidental separation of the parts in handling and transporting, the tags $e^2$ are provided on the upper edge of the rim of the washer in position to be turned down upon the flange $e^3$ of the nut or against the side of the head, that is squared for the application of a wrench in the usual manner.

The washer is preferably made of malleable iron; but any convenient or suitable material may be used.

The operation of the lock is as follows: The bolt being in place, the washer is slipped upon it, bearing the frictional clamp $d$, and the nut held in place by the bent tags, and the whole is turned up together until the projection on the washer strikes the part holding the bolt, and the washer is held against rotation. The nut is then turned up tight, and held against accidental displacement by the means already described.

We claim as our invention—

1. In a nut-lock, the chambered washer $b$, with projections $f\ f'$, and bearing within the chamber the frictional clamp $d$, and the nut $e$, with the tapered and roughened body part $e'$, all substantially as described.

2. In combination, as a nut-lock, the washer $b$, having feet $f$, and chamber $c$, with sockets $c'$, bearing the frictional clamp $d$, and the nut $e$, having the tapered and corrugated body part $e'$, all substantially as described.

3. In combination, the chambered washer $b$, with projections $f f'$ and tags $e^2$, and bearing within the chamber the frictional clamp $d$, and the nut $e$, with the tapered and roughened body part $e'$, all substantially as described.

JOHN F. PLUMMER.
HENRY P. CHAPMAN.

Witnesses:
 JAMES PHELPS,
 LYDIA A. PHELPS.